US009472960B2

(12) United States Patent
Nomura

(10) Patent No.: US 9,472,960 B2
(45) Date of Patent: Oct. 18, 2016

(54) REGULATING DEVICE, BATTERY ASSEMBLY DEVICE AND REGULATING METHOD

(71) Applicant: NEC Corporation, Tokyo (JP)
(72) Inventor: Yojiro Nomura, Tokyo (JP)
(73) Assignee: NEC Corporation, Tokyo (JP)
( * ) Notice: Subject to any disclaimer, the term of this patent is extended or adjusted under 35 U.S.C. 154(b) by 211 days.
(21) Appl. No.: 14/386,846
(22) PCT Filed: Feb. 13, 2013
(86) PCT No.: PCT/JP2013/053319
§ 371 (c)(1),
(2) Date: Sep. 22, 2014
(87) PCT Pub. No.: WO2013/140894
PCT Pub. Date: Sep. 26, 2013

(65) Prior Publication Data
US 2015/0077061 A1    Mar. 19, 2015

(30) Foreign Application Priority Data
Mar. 22, 2012    (JP) .................. 2012-065352

(51) Int. Cl.
*H02J 7/00*    (2006.01)
*H01M 10/44*    (2006.01)
*H01M 10/46*    (2006.01)
(52) U.S. Cl.
CPC .......... *H02J 7/0014* (2013.01); *H01M 10/441* (2013.01); *H01M 10/46* (2013.01); *H02J 7/0003* (2013.01); *H02J 7/007* (2013.01); *H02J 7/0021* (2013.01)
(58) Field of Classification Search
USPC ....................................................... 320/126
See application file for complete search history.

(56) References Cited

U.S. PATENT DOCUMENTS

| 5,652,501 | A  | * | 7/1997 | McClure | H02J 7/0019 |
| | | | | | 320/118 |
| 7,388,349 | B2 | * | 6/2008 | Elder | B60L 3/0046 |
| | | | | | 307/10.6 |
| 7,990,108 | B2 | * | 8/2011 | Aas | H02J 7/0031 |
| | | | | | 320/112 |
| 8,018,202 | B2 | * | 9/2011 | Masson | G01R 19/16542 |
| | | | | | 320/116 |
| 2003/0080955 | A1 | * | 5/2003 | Pulvirenti | G09G 3/36 |
| | | | | | 345/212 |
| 2009/0251103 | A1 | * | 10/2009 | Yamamoto | B60K 6/48 |
| | | | | | 320/133 |
| 2010/0244847 | A1 | * | 9/2010 | Kudo | B60L 3/0046 |
| | | | | | 324/433 |
| 2011/0074354 | A1 | | 3/2011 | Yano | |
| 2011/0279085 | A1 | | 11/2011 | Shigemizu et al. | |

FOREIGN PATENT DOCUMENTS

| JP | 2002-238171 | 8/2002 |
| JP | 2005-151679 | 6/2005 |
| JP | 2010-29015 | 2/2010 |
| JP | 2010-141970 | 6/2010 |
| JP | 2011-72153 | 4/2011 |
| JP | 2012-23896 | 2/2012 |

OTHER PUBLICATIONS

International Search Report mailed Apr. 16, 2013 in corresponding PCT International Application.

* cited by examiner

*Primary Examiner* — Yalkew Fantu
(74) *Attorney, Agent, or Firm* — Finnegan, Henderson, Farabow, Garrett & Dunner LLP

(57) ABSTRACT

A regulating device includes: a generating means for generating an output voltage from an input voltage; a plurality of first switches, respectively corresponding to the plural storage battery units connected in parallel, with each of said first switches interposed between the corresponding storage battery unit and the input side of the generating means; a plurality of second switches, respectively corresponding to the plural storage battery units, with each of said second switches interposed between the corresponding storage battery unit and the output side of the generating means; a detecting means for detecting the voltage of each of the plural storage battery units; and, a control means that, referring to the result of detection from the detecting means, identifies first storage battery units whose voltages are higher than the average value of voltage of the plural storage battery units and second storage battery units whose voltages are lower than the average value, from the plural storage battery units, and turns on the first control switches corresponding to the first storage battery units from among the plural first switches and the second control switches corresponding to the second storage battery units from among the second switches.

6 Claims, 4 Drawing Sheets

REGULATING DEVICE, BATTERY ASSEMBLY DEVICE AND REGULATING METHOD

CROSS-REFERENCE TO RELATED PATENT APPLICATIONS

This application is a National Stage Entry of International Application No. PCT/JP2013/053319, filled Feb. 13, 2013, which claims priority from Japanese Patent Application No. 2012-065352, filed Mar. 22, 2012. The entire contents of the above-reference applications are expressly incorporated herein by reference.

TECHNICAL FIELD

The present invention relates to a regulating device, a battery assembly device and a regulating method, in particular relates to a regulating device, a battery assembly device and a regulating method for regulating the voltage difference between multiple storage battery units that are connected in parallel.

BACKGROUND ART

There has been known a battery assembly formed of a plurality of connected storage batteries (e.g., a plurality of lithium-ion secondary battery cells).

Patent Document 1 discloses a battery assembly system in which a plurality of series connected battery units, each having multiple storage batteries connected in series, are connected in parallel.

In an assembled battery which consists of series connected battery units (storage battery units) connected in parallel, there occurs the problem in which current flows from a series battery unit of a higher voltage to a series battery unit of a lower voltage during charging due to voltage variation between series connected battery units. Therefore, it is necessary that voltage variability between series connected battery units be reduced.

In the battery assembly system disclosed in Patent Document 1, a current control device that can control the magnitude of electric current flowing through itself, e.g., MOSFET (Metal Oxide Semiconductor Field Effect Transistor) is connected in series with each of the series connected battery units so as to regulate the current flowing through the series connected battery units by controlling all the current control devices at the same time, whereby the voltage variation between the series connected battery units is reduced.

RELATED ART DOCUMENTS

Patent Documents

Patent Document 1: JP2010-29015A

SUMMARY OF THE INVENTION

Problems to be Solved by the Invention

In the battery assembly system disclosed in Patent Document 1, in order to reduce voltage variation between plural series connected battery units, it is necessary to simultaneously and appropriately control the plural current control devices that are respectively connected to the plural series connected battery units.

Accordingly, the battery assembly system disclosed in Patent Document 1 requires a complicated process of simultaneously and appropriately controlling the plural current control devices that are respectively connected to the plural series connected battery units.

The object of the present invention is to provide a regulating device, a battery assembly device and a regulating method that can resolve the above problem.

Means for Solving the Problems

The regulating device of the present invention is a regulating device for regulating voltage difference between plural storage battery units connected in parallel, and includes:
a generating means for generating an output voltage from an input voltage;
a plurality of first switches, corresponding to the plural storage battery units, respectively, with each of said first switches interposed between the corresponding storage battery unit and the input side of the generating means;
a plurality of second switches, corresponding to the plural storage battery units respectively, with each of said second switches interposed between the corresponding storage battery unit and the output side of the generating means;
a detecting means for detecting the voltage of each of the plural storage battery units; and,
a control means that, referring to the result of detection from the detecting means, identifies first storage battery units whose voltages are higher than the average value of voltage of the plural storage battery units and second storage battery units of lower voltage than the average value, from among the plural storage battery units, and turns on the first control switches corresponding to the first storage battery units among the plural first switches and the second control switches corresponding to the second storage battery units among the second switches.

The battery assembly device of the present invention includes a plurality of storage battery units connected in parallel and the above regulating device.

The regulating method of the present invention is a regulating method performed by a regulating device that includes a generating means for generating an output voltage from an input voltage to regulate voltage difference between plural storage battery units connected in parallel, comprising the steps of:
detecting the voltage of each of the plural storage battery units;
identifying, by referring to the result of the voltage detection, first storage battery units whose voltages are higher than the average value of voltage of the plural storage battery units and second storage battery units whose voltages are lower than the average value, from the plural storage battery units; and,
turning on the first control switches corresponding to the first storage battery units from among the plural first switches that correspond to the plural storage battery units, respectively, with each of said first switches interposed between the corresponding storage battery unit and the input side of the generating means, and turning on the second control switches corresponding to the second storage battery units among the second switches that correspond to the plural storage battery units respectively, with each of said second switches interposed between the corresponding storage battery unit and the output side of the generating means.

Effect of the Invention

The present invention can make it unnecessary to perform a complicated process of simultaneously and appropriately controlling plural current control devices that are respectively connected to the plural series connected battery units in order to reduce voltage variation between the plural storage battery units connected in parallel.

MODE FOR CARRYING OUT THE INVENTION

Hereinbelow, one exemplary embodiment of the present invention will be described with reference to the drawings.

Figure 1:
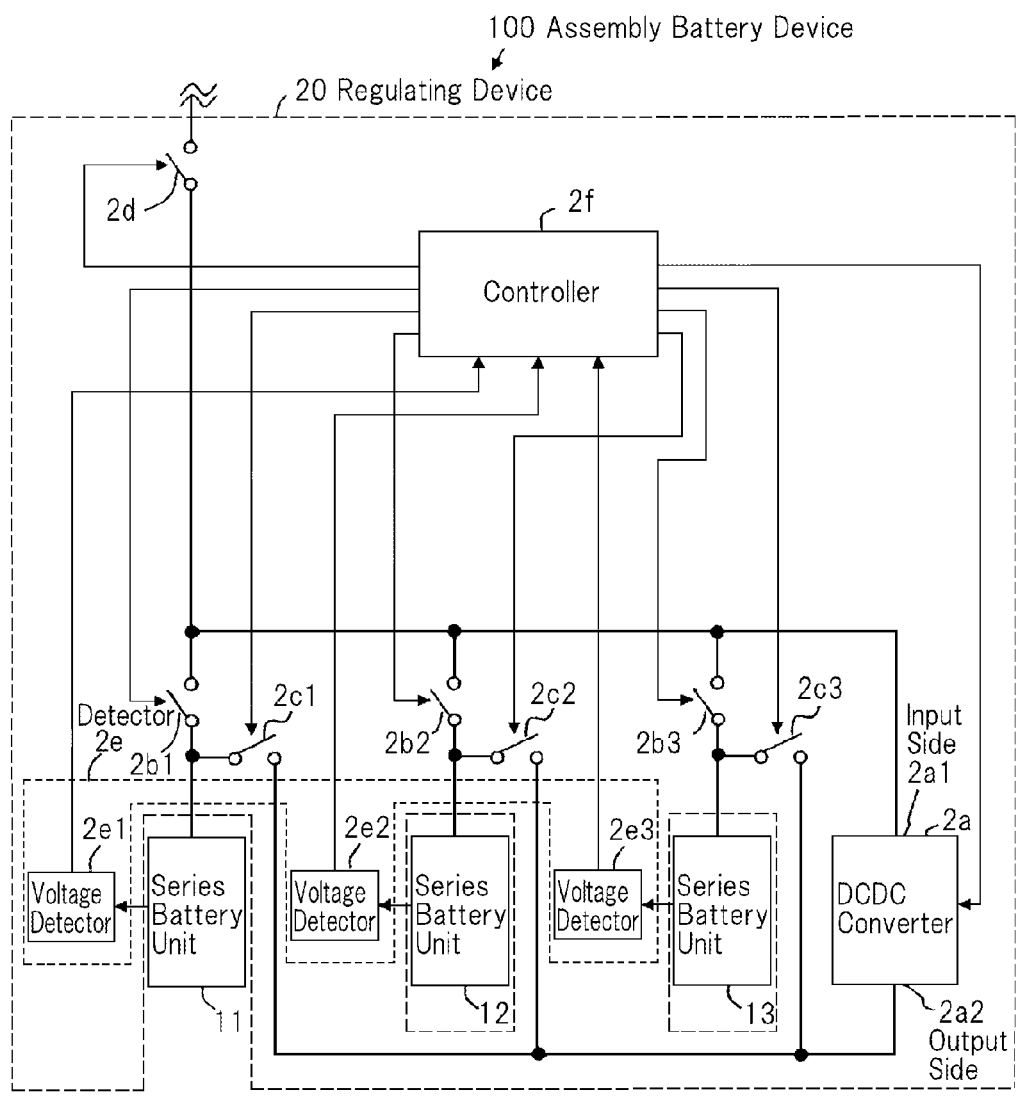
[FIG. 1] A block diagram showing battery assembly device 100 of one exemplary embodiment of the present invention.

FIG. 1 is a block diagram showing battery assembly device 100 of one exemplary embodiment of the present invention.

In FIG. 1, battery assembly device 100 includes series connected battery units 11 to 13 and regulating device 20.

Series connected battery units 11 to 13 are one example of the plural storage battery units. Series connected battery units 11 to 13 are connected in parallel to each other. Series connected battery units 11 to 13 each have a plurality of storage batteries (e.g., plural lithium-ion secondary battery cells) connected in series.

Here, the storage battery is not limited to a lithium-ion secondary battery cell, but may be changed as appropriate. As the storage battery unit, a single secondary battery cell may be used instead of the series battery unit. Further, in FIG. 1, the number of series connected battery units is 3, but the number of series connected battery units may be 2 or more.

Regulating device 20 includes DCDC converter 2a, switches 2b1 to 2b3, switches 2c1 to 2c3, switch 2d, detector 2e, and controller 2f. Detector 2e includes voltage detectors 2e1 to 2e3.

DCDC converter 2a is one example of the generating means.

DCDC converter 2a generates an output voltage from the input voltage received at input side 2a1. DCDC converter 2a outputs an output voltage from output side 2a2.

In the present exemplary embodiment, DCDC converter 2a sets the level of the output voltage, in accordance with the output instructions from controller 2f.

Switches 2b1 to 2b3 are one example of the plural first switches.

Switches 2b1 to 2b3 correspond to series connected battery units 11 to 13, respectively. For example, switch 2b1 corresponds to series battery unit 11, and switch 2b3 corresponds to series battery unit 13.

Switches 2b1 to 2b3 each are interposed between the corresponding series battery unit and input side 2a1 of DCDC converter 2a.

Here, the number of the first switches (switches 2b1 to 2b3) is equal to the number of the series connected battery units.

Switches 2c1 to 2c3 are one example of the plural second switches.

Switches 2c1 to 2c3 correspond to series connected battery units 11 to 13, respectively. For example, switch 2c1 corresponds to series battery unit 11, and switch 2c3 corresponds to series battery unit 13.

Switches 2c1 to 2c3 each are interposed between the corresponding series battery unit and output side 2a2 of DCDC converter 2a.

Here, the number of the second switches (switches 2c1 to 2c3) is equal to the number of the series connected battery units.

Switch 2d connects series connected battery units 11 to 13 connected in parallel to an external charger (not illustrated), an external load (not illustrated) and/or a power supply system (not illustrated).

Detector 2e is one example of the detecting means.

Detector 2e detects each voltage of series connected battery units 11 to 13.

Voltage detectors 2e1 to 2e3 correspond to series connected battery units 11 to 13, respectively. For example, voltage detector 2e1 corresponds to series battery unit 11 and voltage detector 2e3 corresponds to series battery unit 13.

Voltage detectors 2e1 to 2e3 detect the voltage of the corresponding series connected battery units, respectively.

Controller 2f is one example of the control means.

Controller 2f, referring to the result of detection from detector 2e, identifies series connected battery units whose voltage are higher (which will be referred to hereinbelow as "target battery units to be discharged") than the average value of voltage of series connected battery units 11 to 13 (which will be simply referred to hereinbelow as "average value") and series connected battery units whose voltages are lower (which will be referred to hereinbelow as "target battery units to be charged") than the average value.

Here, the target battery unit to be discharged is one example of the first storage battery unit and the target battery unit to be charged is one example of the second storage battery unit.

In the present exemplary embodiment, controller 2f identifies one unit (e.g., the series battery unit of the highest voltage) from among the series connected battery units whose voltages are higher than the average value among series connected battery units 11 to 13, as the target battery unit to be discharged. Here, the series battery unit to be identified as the target battery unit to be discharged should not be limited to the series battery unit of the highest voltage but can be changed as appropriate.

Further, in the present embodiment, controller 2f identifies one unit (e.g., the series battery unit of the lowest voltage) from among the series connected battery units whose voltages are lower than the average value from among series connected battery units 11 to 13, as the target battery unit to be charged. Here, the series battery unit to be identified as the target battery unit to be charged should not be limited to the series battery unit of the lowest voltage but can be changed as appropriate.

Controller 2f identifies the switch (which will be referred to hereinbelow as "the first control switch") corresponding to the target battery unit to be discharged, from switches 2b1 to 2b3. Further, controller 2f identifies the switch (which will be referred to hereinbelow as "the second control switch") corresponding to the target battery unit to be charged, from switches 2c1 to 2c3.

Controller 2f turns on the first control switch and the second control switch.

Controller 2f also controls the magnitude of the output voltage from DCDC converter 2a, in accordance with the battery characteristics (e.g., rated voltage) of the target battery unit to be charged and the target battery unit to be discharged. In the present exemplary embodiment, controller $2f$ controls the output instruction to indicate the magnitude of the output voltage from DCDC converter $2a$, in accordance with the battery characteristics of the target battery unit to be charged and the target battery unit to be discharged, to thereby regulate the magnitude of the output voltage from DCDC converter $2a$. Here, the battery characteristics of individual series connected battery units have been previously stored in controller $2f$.

When the difference in voltage between the target battery unit to be discharged and the target battery unit to be charged becomes equal to or lower than a predetermined value, controller $2f$ turns off, at least, one of the first control switch and the second control switch. Here, the predetermined value has been previously stored in controller $2f$.

Next, the operation will be described.

Figure 2:
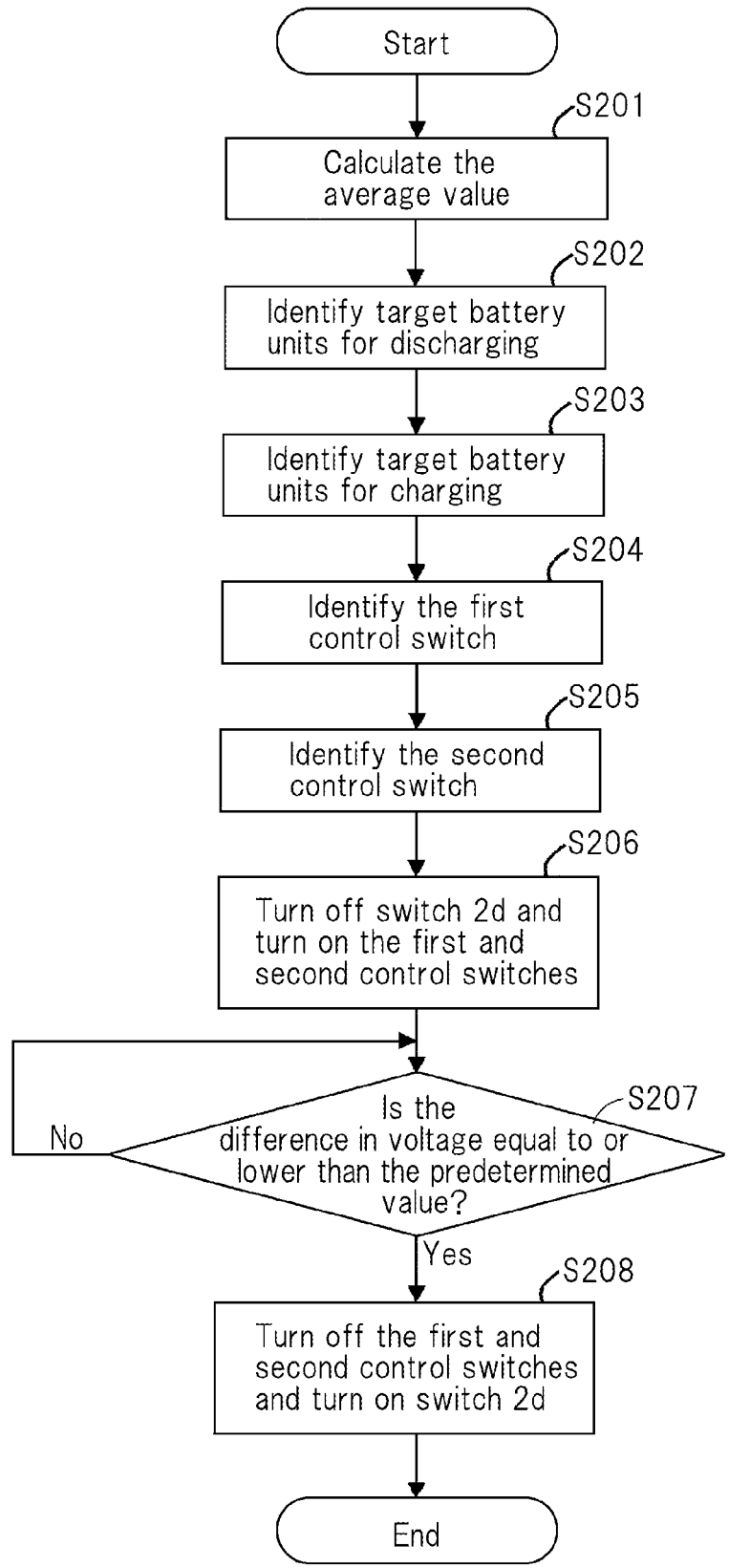
[FIG. 2] A flow chart for illustrating the operation of regulating device 20.

FIG. 2 is a flow chart for illustrating the operation of regulating device 20.

Here, it is assumed that voltage detectors $2e1$ to $2e3$ detect the voltages of series connected battery units 11 to 13, respectively and outputs the detected result to controller $2f$. It is also assumed that switches $2b1$ to $2b3$ are turned on and switches $2c1$ to $2c3$ are turned off.

Controller $2f$ calculates the average value of the voltages of series connected battery units 11 to 13 at predetermined timing (e.g., at time when charging of series connected battery units 11 to 13, connected in parallel, and connected to an external charger, has been completed by the external charger), by referring to the detection result from detector $2e$ (Step S201). Here, the predetermined timing should not be limited to the above, but can be changed as appropriate.

Subsequently, controller $2f$ identifies one unit (the series battery unit of the highest voltage in the following description) from among the series connected battery units whose voltages are higher than the average value from among series connected battery units 11 to 13, as the target battery unit to be discharged (Step S202).

Then, controller $2f$ identifies one unit (the series battery unit of the lowest voltage in the following description) from among the series connected battery units whose voltages are lower than the average value from series connected battery units 11 to 13, as the target battery unit to be charged (Step S203).

Next, controller $2f$ identifies the switch (the first control switch) corresponding to the target battery unit to be discharged, from among switches $2b1$ to $2b3$, meaning that the controller identifies the switch that is connected to the target battery unit to be discharged, from among switches $2b1$ to $2b3$ (Step S204).

Further, controller $2f$ identifies the switch (the second control switch) corresponding to the target battery unit to be charged, from switches $2c1$ to $2c3$, meaning that the controller identifies the switch that is connected to the target battery unit to be charged, among switches $2c1$ to $2c3$ (Step S205).

Then, controller $2f$ turns off switch $2d$ and turns on the first control switch and the second control switch (Step S206). Here, controller $2f$ turns off the switches that are different from the first control switch and the second control switch, from among switches $2b1$ to $2b3$ and $2c1$ to $2c3$.

When switch $2d$ is turned off and the first control switch and second control switch are turned on, the target battery unit to be discharged is connected to input side $2a1$ of DCDC converter $2a$ and the target battery unit to be charged is connected to output side $2a2$ of DCDC converter $2a$.

Accordingly, DCDC converter $2a$ generates an output voltage based on the voltage from the target battery unit to be discharged and applies the output voltage to the target battery unit to be discharged to charge the target battery unit to be discharged.

Thus, the target battery unit that is to be discharged charges the target battery unit that is to be charged.

Figure 3:
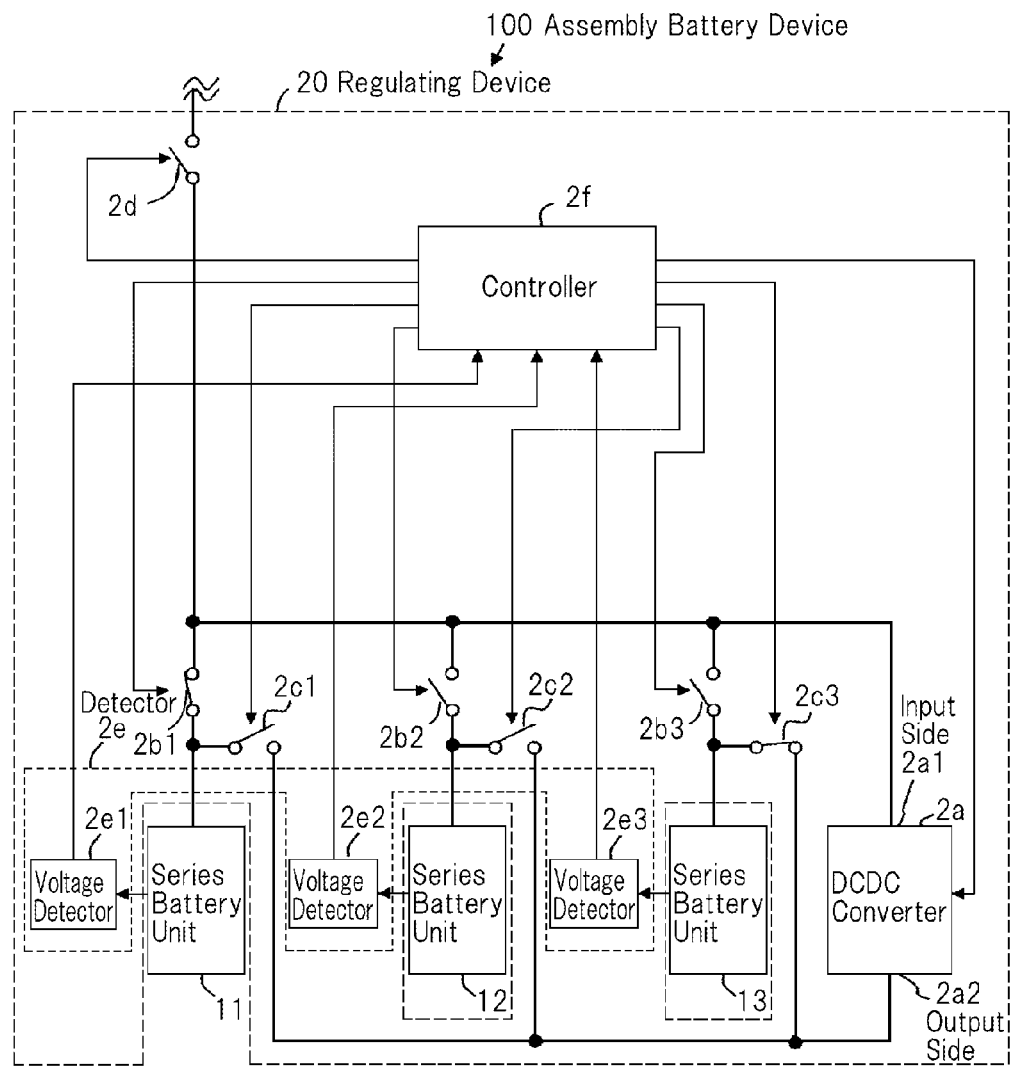
[FIG. 3] A diagram for illustrating one example of the on/off states of switches.

FIG. 3 is a diagram for illustrating the on/off states of switches $2b1$ to $2b3$ and $2c1$ to $2c3$ and the on/off state of operation switch $2d$ when series battery unit 11 is the target battery unit to be discharged and series battery unit 13 is the target battery unit to be charged.

In FIG. 3, switch $2b1$ corresponding to series battery unit 11 (target battery unit to be discharged) is turned on from among switches $2b1$ to $2b3$, switch $2c3$ corresponding to series battery unit 13 (target battery unit to be charged) is turned on from among switches $2c1$ to $2c3$, and operation switch $2d$ is turned off. Accordingly, DCDC converter $2a$ generates an output voltage based on the voltage from series battery unit 11 and applies the output voltage to series battery unit 13 to charge series battery unit 13.

Controller $2f$ controls the output instruction to indicate the magnitude of the output voltage from DCDC converter $2a$, in accordance with the battery characteristics of the target battery unit to be charged and the target battery unit to be discharged, to thereby regulate the magnitude of the output voltage from DCDC converter $2a$. For example, controller $2f$ adjusts the magnitude of the output voltage from DCDC converter $2a$ by use of the output instruction so that the output voltage from DCDC converter $2a$ will be equal to or lower than the rated voltage of the target battery unit to be charged.

Then, controller $2f$ waits until the difference between the voltage of the target battery unit to be discharged and the voltage of the target battery unit to be charged becomes equal to or lower than the predetermined value (Step S207).

When the difference between the voltage of the target battery unit to be discharged and the voltage of the target battery unit to be charged becomes equal to or lower than the predetermined value at Step S207, control $2f$ turns off, at least, one of the first control switch and the second control switch (both the first control switch and the second control switch in this exemplary embodiment) and turns on switch $2d$, to end charging of the target battery unit to be charged by the target battery unit to be discharged (Step S208).

Here, controller $2f$ may repeat the operation shown in FIG. 2 until the voltages of all the series connected battery units become equal or until the difference between highest voltage and the lowest voltage of series connected battery units 11 to 13 becomes smaller than a preset permissible value. It is assumed that the permissible value is stored in advance in controller $2f$.

Next, the effect of the present exemplary embodiment will be described.

According to the present exemplary embodiment, DCDC converter $2a$ generates an output voltage from the input voltage. Switches $2b1$ to $2b3$ correspond to series connected battery units 11 to 13, respectively, with each of said switches interposed between the corresponding series battery unit and input side $2a1$ of DCDC converter $2a$. Switches $2c1$ to $2c3$ correspond to series connected battery units 11 to 13, respectively, with each of said switches interposed between the corresponding series battery unit and output side $2a2$ of DCDC converter $2a$. Detector $2e$ detects each voltage of series connected battery units 11 to 13.

Controller $2f$, referring to the result of detection from detector $2e$, identifies the target battery unit to be discharged and the target battery unit to be charged from series connected battery units 11 to 13, and turns on the first control switch corresponding to the target battery unit to be discharged from among switches $2b1$ to $2b3$ and turns on the second control switch corresponding to the target battery unit to be charged from among switches $2c1$ to $2c3$. As a result, DCDC converter $2a$ generates an output voltage from the voltage from the target battery unit to be discharged and applies the output voltage to the target battery unit to be charged and charges the target battery unit to be charged.

Thereby, it is possible to reduce voltage variation between the series connected battery units. Further, performing a complicated process of simultaneously and appropriately controlling plural current control devices that are respectively connected to the plural series connected battery units in order to reduce voltage variation between the series connected battery units can be made unnecessary.

Here, the above effect can also be obtained in regulating device 20 formed of DCDC converter $2a$, switches $2b1$ to $2b3$, switches $2c1$ to $2c3$, detector $2e$, and controller $2f$.

Figure 4:
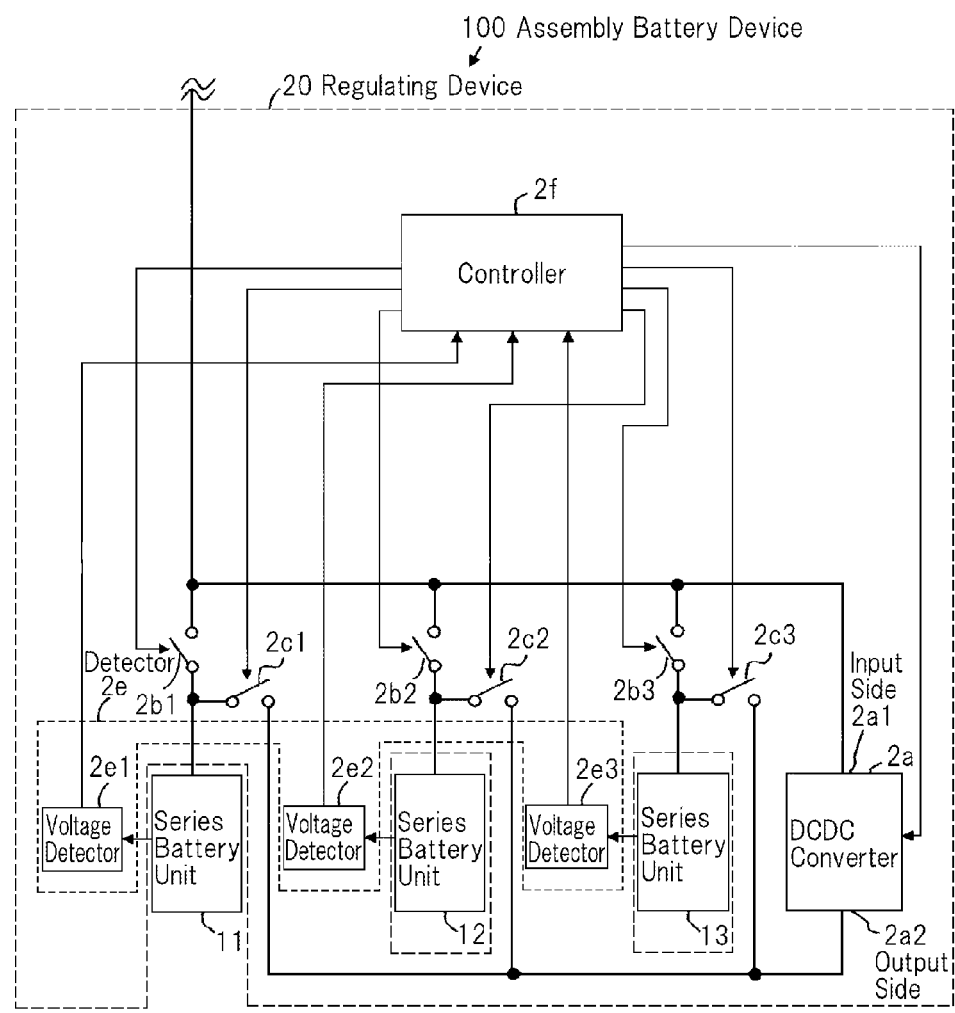
[FIG. 4] A diagram showing regulating device 20 formed of DCDC converter 2a, switches 2b1 to 2b3 and switches 2c1 to 2c3, detector 2e and controller 2f.

FIG. 4 is a diagram showing regulating device 20 formed of DCDC converter $2a$, switches $2b1$ to $2b3$ and switches $2c1$ to $2c3$, detector $2e$, and controller $2f$.

Also in this exemplary embodiment, controller $2f$ identifies one unit from among the series connected battery units whose voltages are higher than the average value among series connected battery units 11 to 13, as the target battery unit to be discharged and identifies one unit from among series connected battery units whose voltages are lower than the average value from among series connected battery units 11 to 13, as the target battery unit to be charged.

Accordingly, it is possible to charge and discharge series connected battery units individually, hence this configuration facilitates adjustment of the voltage of each of individual series connected battery units.

In the present exemplary embodiment, a DCDC converter is used as the generating means. Accordingly, it is possible to appropriately control charging and discharging of series connected battery units that generate d.c. voltage.

In the present exemplary embodiment, controller $2f$ turns off, at least, one of the first control switch and the second control switch when the difference between the voltage of the target battery unit to be discharged and the voltage of the target battery unit to be charged becomes equal to or lower than a predetermined value.

Accordingly, it is possible to automatically end charging of the target battery unit to be charged by the target battery unit to be discharged.

In the present exemplary embodiment, Step S202 and Step S203 shown in FIG. 2 may be done in the reverse order. Step S204 and Step S205 shown in FIG. 2 may also be done in the reverse order.

In the exemplary embodiments described heretofore, the illustrated configurations are mere examples, so that the present invention should not be limited to the configurations.

Although the present invention has been explained with reference to the exemplary embodiments, the present invention should not be limited to the above exemplary embodiments. Various modifications that can be understood by those skilled in the art may be made to the structures and details of the present invention within the scope of the present invention. This application claims priority based on Japanese Patent Application No. 2012-65352, filed on March 22, 2012, and should incorporate all the disclosure thereof herein.

BRIEF DESCRIPTION OF THE DRAWINGS 100 battery assembly device
11-13 series battery unit
20 regulating device
$2a$ DCDC converter
$2b1$ to $2b3$, $2c1$ to $2c3$, switch
$2e$ detector
$2e1$ to $2e3$ voltage detector
$2f$ controller

The invention claimed is:

1. A regulating device for regulating voltage difference between plural storage battery units connected in parallel, comprising:
  a generating unit for generating an output voltage from an input voltage;
  a plurality of first switches, corresponding to the plural storage battery units, respectively, with each of said first switches interposed between the corresponding storage battery unit and the input side of the generating unit;
  a plurality of second switches, corresponding to the plural storage battery units respectively, with each of said second switches interposed between the corresponding storage battery unit and the output side of the generating unit;
  a detecting unit for detecting the voltage of each of the plural storage battery units; and,
  a control unit that, referring to the result of detection from the detecting unit, identifies first storage battery units whose voltages are higher than the average value of voltage of the plural storage battery units and second storage battery units whose voltages are lower than the average value of the plural storage battery units, and turns on the first control switches corresponding to the first storage battery units from among the plural first switches and the second control switches corresponding to the second storage battery units from among the second switches.

2. The regulating device according to claim 1, wherein the control unit identifies one unit from among the storage battery units whose voltages are higher than the average value from among the plural storage battery units as the first battery unit and identifies one unit from among storage battery units whose voltages are lower than the average value among the plural storage battery units as the second battery unit.

3. The regulating device according to claim 1, wherein the generating unit is a DCDC converter.

4. The regulating device according to claim 1, wherein the control unit turns off, at least, one of the first control switch and the second control switch when the difference in voltage between the first storage battery unit and the second storage battery unit becomes equal to or lower than a predetermined value.

5. A battery assembly device comprising a plurality of storage battery units connected in parallel and a regulating device according to claim 1.

6. A regulating method performed by a regulating device that includes a generating unit for generating an output voltage from an input voltage to regulate voltage difference between plural storage battery units connected in parallel, comprising the steps of:
  detecting the voltage of each of the plural storage battery units;
  identifying, by referring to the result of the voltage detection, first storage battery units whose voltages are higher than the average value of voltage of the plural storage battery units and second storage battery units whose voltages are lower than the average value of the plural storage battery units; and, turning on the first control switches corresponding to the first storage battery units from among the plural first switches that correspond to the plural storage battery units, respectively, with each of said first switches interposed between the corresponding storage battery unit and the input side of the generating unit, and turning on the second control switches corresponding to the second storage battery units from among the second switches that correspond to the plural storage battery units respectively, with each of said second switches interposed between the corresponding storage battery unit and the output side of the generating unit.

* * * * *